United States Patent
Haroldsen

(10) Patent No.: US 12,072,988 B2
(45) Date of Patent: *Aug. 27, 2024

(54) ENCRYPTION CONVERTER

(71) Applicant: Logical Design Solutions, Inc., Naperville, IL (US)

(72) Inventor: Kyle D. Haroldsen, Aurora, IL (US)

(73) Assignee: Logical Design Solutions, Inc, Naperville, IL (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/352,679

(22) Filed: Jun. 21, 2021

(65) Prior Publication Data

US 2022/0067175 A1 Mar. 3, 2022

Related U.S. Application Data

(63) Continuation of application No. 16/390,743, filed on Apr. 22, 2019, now Pat. No. 11,157,632.

(51) Int. Cl.
*G06F 21/60* (2013.01)
*G06F 21/62* (2013.01)
*G06F 21/10* (2013.01)

(52) U.S. Cl.
CPC ........ *G06F 21/602* (2013.01); *G06F 21/6218* (2013.01); *G06F 21/1078* (2023.08)

(58) Field of Classification Search
CPC ............... G06F 21/6218; G06F 21/602; G06F 2221/0775; G06F 21/1078
USPC .......................................................... 713/189
See application file for complete search history.

(56) References Cited

U.S. PATENT DOCUMENTS

| | | | |
|---|---|---|---|
| 8,990,796 B2 | 3/2015 | Lamantia et al. | |
| 10,033,703 B1* | 7/2018 | Sharifi Mehr | G06F 21/6218 |
| 11,100,232 B1* | 8/2021 | Juncker | H04L 63/102 |
| 2016/0117519 A1* | 4/2016 | Hashii | G06F 16/183 |
| | | | 713/166 |
| 2019/0324678 A1* | 10/2019 | Griffes | G11B 20/00086 |

* cited by examiner

*Primary Examiner* — Benjamin A Kaplan
(74) *Attorney, Agent, or Firm* — Michael P. Mazza, LLC; Michael P Mazza

(57) ABSTRACT

A method for converting data on a computer from an original encrypted format to a new encrypted format without exposing the data in a decrypted state during the conversion process. The computer(s) is locked during the conversion process. The computer data is now re-encrypted to the new format, the original encryption is then removed, and the new encryption software is applied. Finally, the computer with its newly-encrypted data is unlocked for normal usage.

4 Claims, 10 Drawing Sheets

ENCRYPTION CONVERTER

BACKGROUND OF THE INVENTION

The present invention generally relates to a method for securely changing the encryption on a computer without leaving the data decrypted.

Organizations that are concerned about data security, specifically with respect to laptop computers, will encrypt the computer's local data to ensure that if a computer is stolen or fails into the wrong hands, the data will remain encrypted and unreadable to unauthorized persons, Once a computer's drive is encrypted, changing the encryption currently requires one of two methods. With the first method, the hard drive is decrypted, the encryption is removed, and then new encryption software is installed and the data is encrypted. The problem with this method is that the data is vulnerable and potentially exposed the moment the decryption begins, and this vulnerability continues until the new encryption is complete. For organizations, where any data exposure is unacceptable, this method is not practical. With the second method, all the data is copied to a server share, the hard drive is wiped, the operating system is reinstalled, the drive is encrypted, and then the data is copied back to the computer. This method is time-consuming and risky, particularly if the data is stored on a less-than-secure location.

The present invention was created to provide a faster and more secure method of converting the encryption type, and keeping all of the data encrypted while also keeping all of the data local on the computer and secure during the encryption process.

Accordingly, there is a need for software that provides encryption on a computer's local hard drive, enabling the conversion from one type of encryption to another, while leaving the data fully encrypted and secure, without requiring any data to be decrypted, and without needing to temporarily remove the data from the computer. It would also be advantageous to be able to execute such encryption remotely, without the need to interact with the computer, while logging all progress to a central server, and while securely locking the computer until the process is complete.

SUMMARY OF THE INVENTION

The objects mentioned above, as well as other objects, are solved by the present invention, which overcomes disadvantages of encryption converters, while providing new advantages not previously associated with such software. This summary is provided to introduce a selection of concepts in a simplified form that are further described below in the Detailed Description, so that the claimed invention may be better understood. However, this summary is not intended to limit the scope of the claimed subject matter.

In one preferred embodiment of the present invention, a method is employed for converting data with a first, original layer of encryption on local hard drives of one or more computers, by adding a second layer of encryption to the data while removing the first layer of encryption, and without exposing the data in a decrypted state during the conversion process. In this method, the conversion process is launched, and the one or more computers to be re-encrypted are locked for the duration of the conversion process, so that users of the computers have no access to the computers during the conversion process. Next, second layer of encryption is added to the drives of computers, thereby re-encrypting all of the data on the drives. After the second layer of encryption has been added to the drives of the computers, the first layer of encryption is removed, without the need for decrypting any of the data on the drives of the computers. The new encryption software relating to the second layer of encryption is applied, and the computers are unlocked for normal usage, so that the users once again have access to the computers.

In one particularly preferred embodiment, the launching step may be performed remotely, and the conversion process may be executed without the need to interact with the computers. The conversion process may also be executed while logging all progress to a central server in communication with the computers.

DEFINITION OF CLAIM TERMS

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"First layer of encryption" means data originally encrypted using one or more original encryption algorithms, which may be decrypted and removed using a first "key."

"Second layer of encryption" means the same data, re-encrypted using one or more secondary encryption algorithms, which may be decrypted using a second "key."

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

"Encryption" is the process of converting information or data into a code, especially to prevent unauthorized access. Here the present invention is software executed on already-encrypted data that is believed to be vulnerable, corrupt, or for whatever reason, unwanted. The object of the present invention is to replace the original encryption with a new encryption, and during this process to avoid leaving the data in a vulnerable, decrypted state, even for an instant.

Figure 1:
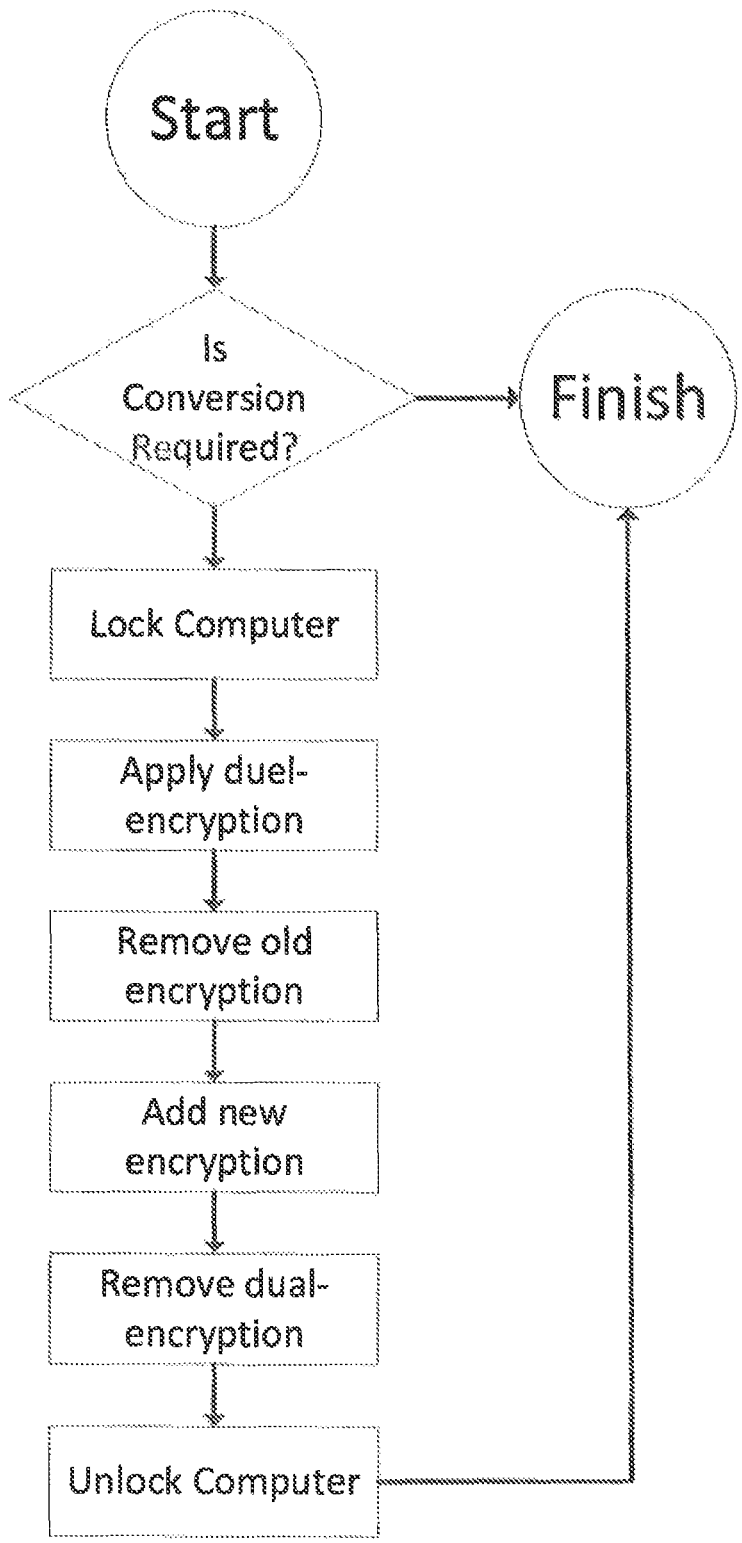
FIG. 1 is a high-level workflow of the encryption conversion process in a particularly preferred embodiment, which starts by detecting if the process is needed, and then continues to follow six general steps to ensure the process for converting the encryption is completed securely and reliably.
Figure 2:
FIG. 2 shows triggers which the Encryption Converter uses to determine status, which controls when the conversion workflow moves from one step to another.
Figure 2:
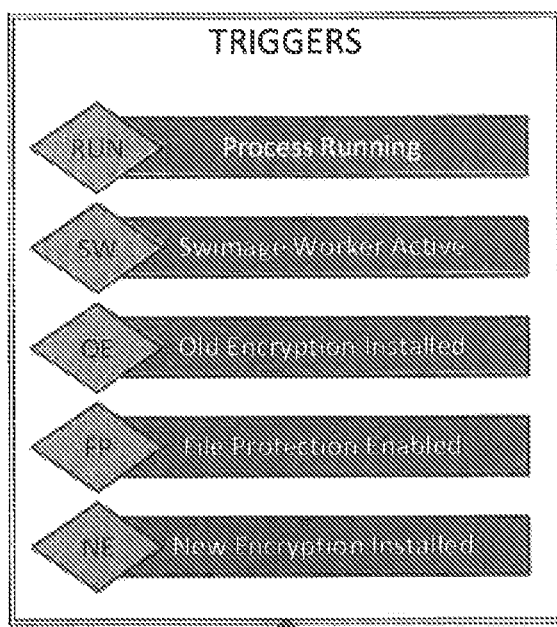
Figure 3:
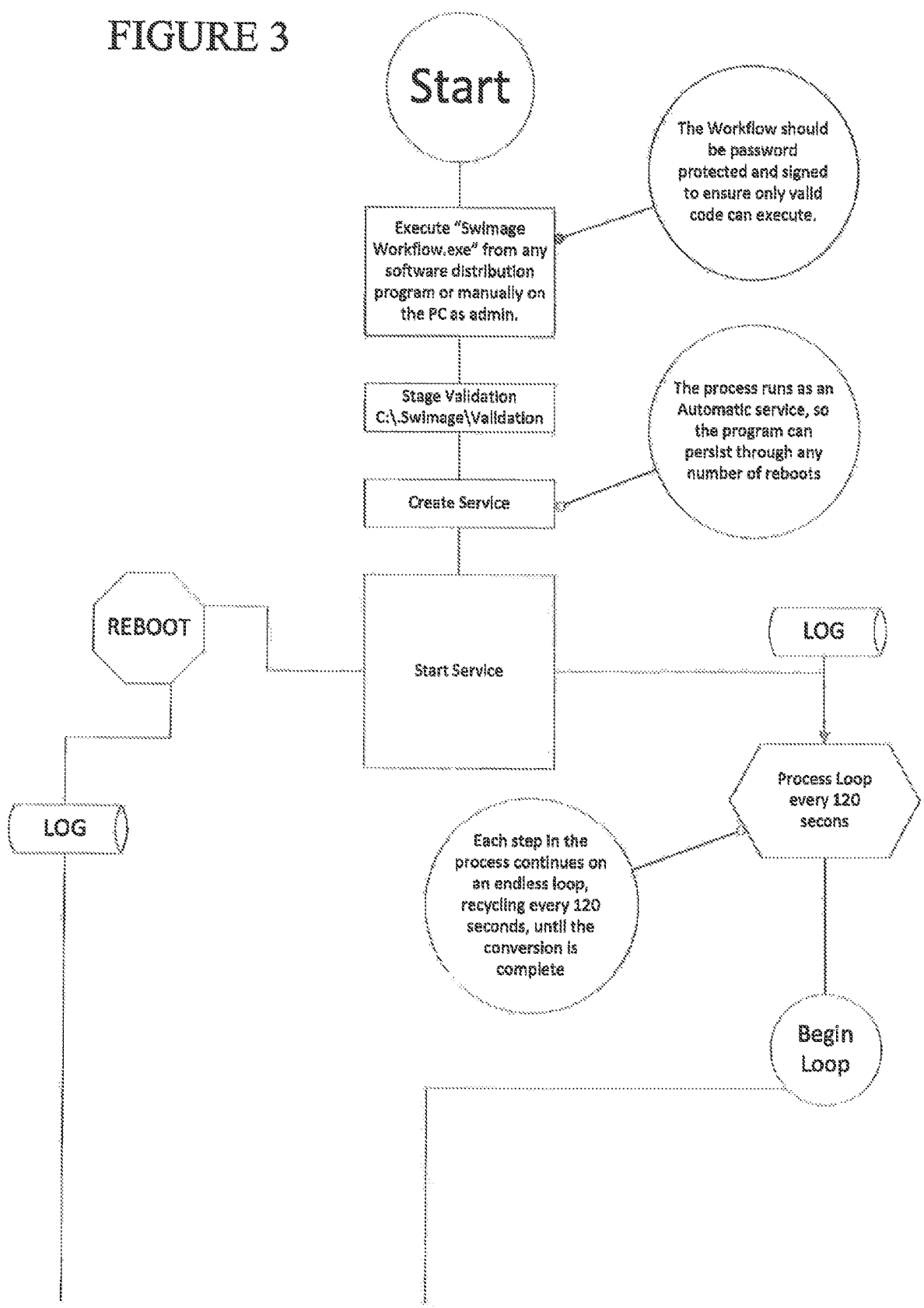
FIG. 3 is a detailed workflow outline of every step in the conversion process of the particularly preferred embodiment, showing how triggers are utilized, and how the workflow continually loops and validates each step until the conversion process is complete.
Figure 3:
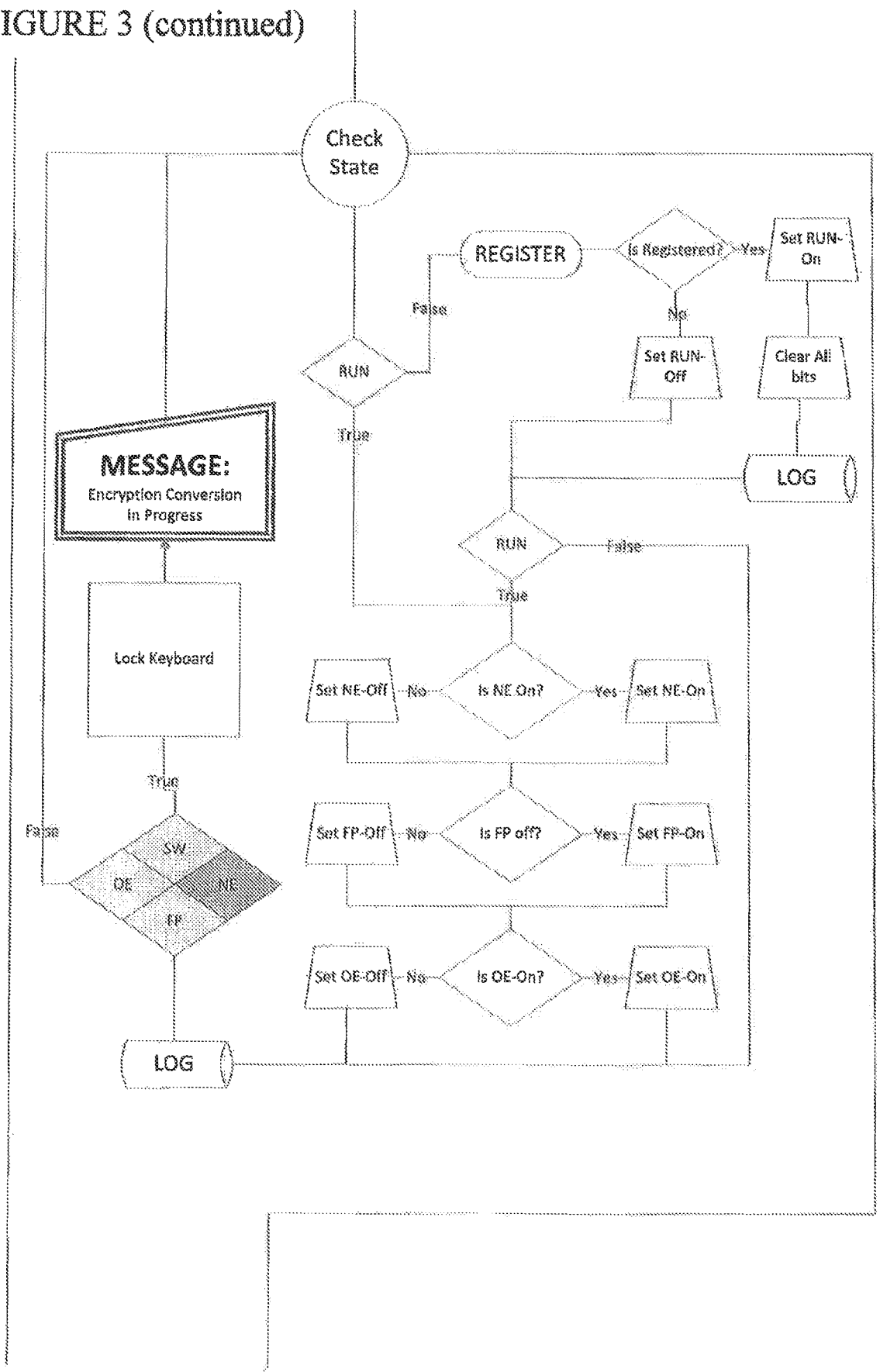
Figure 3:
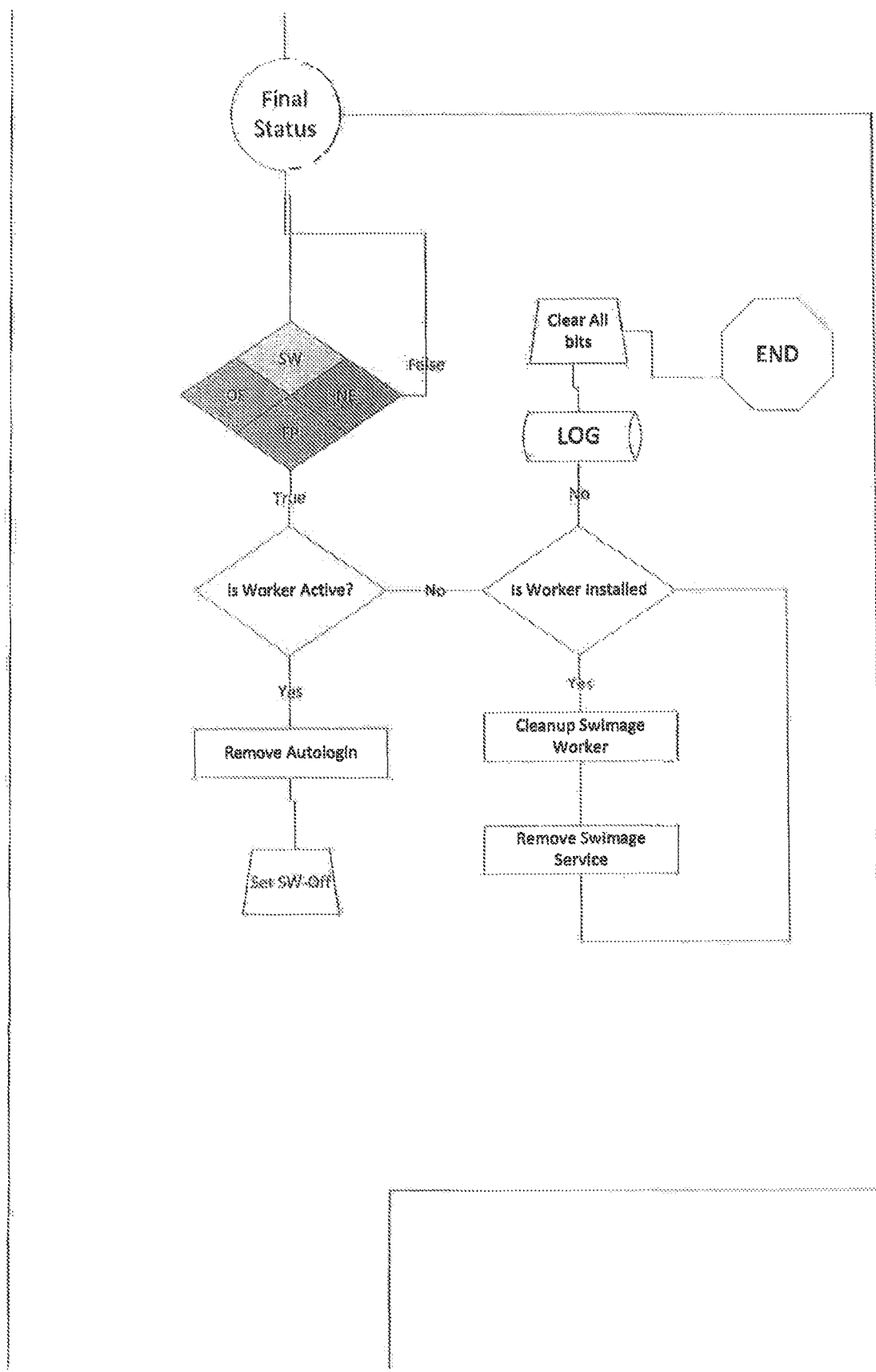
Figure 3:
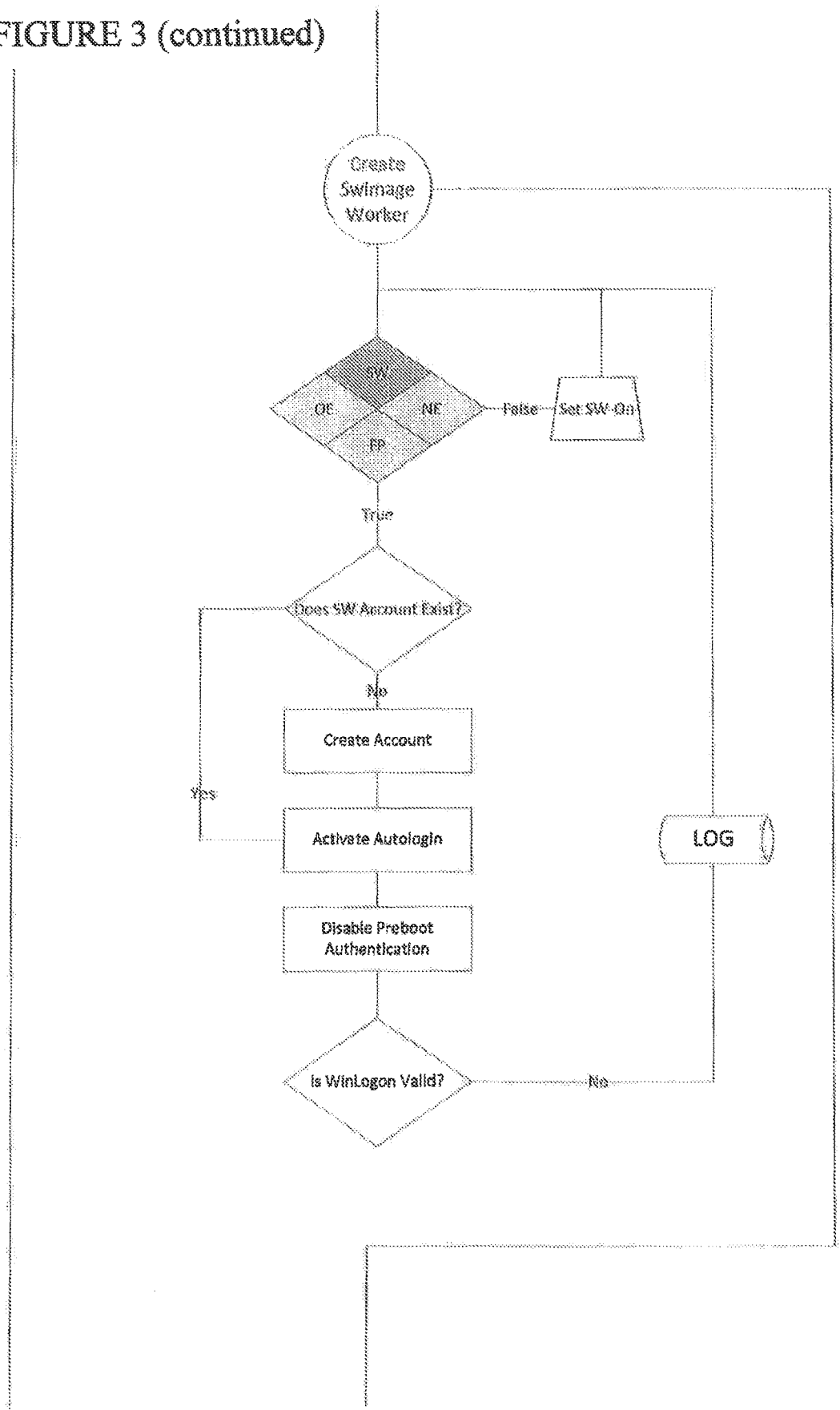
Figure 3:
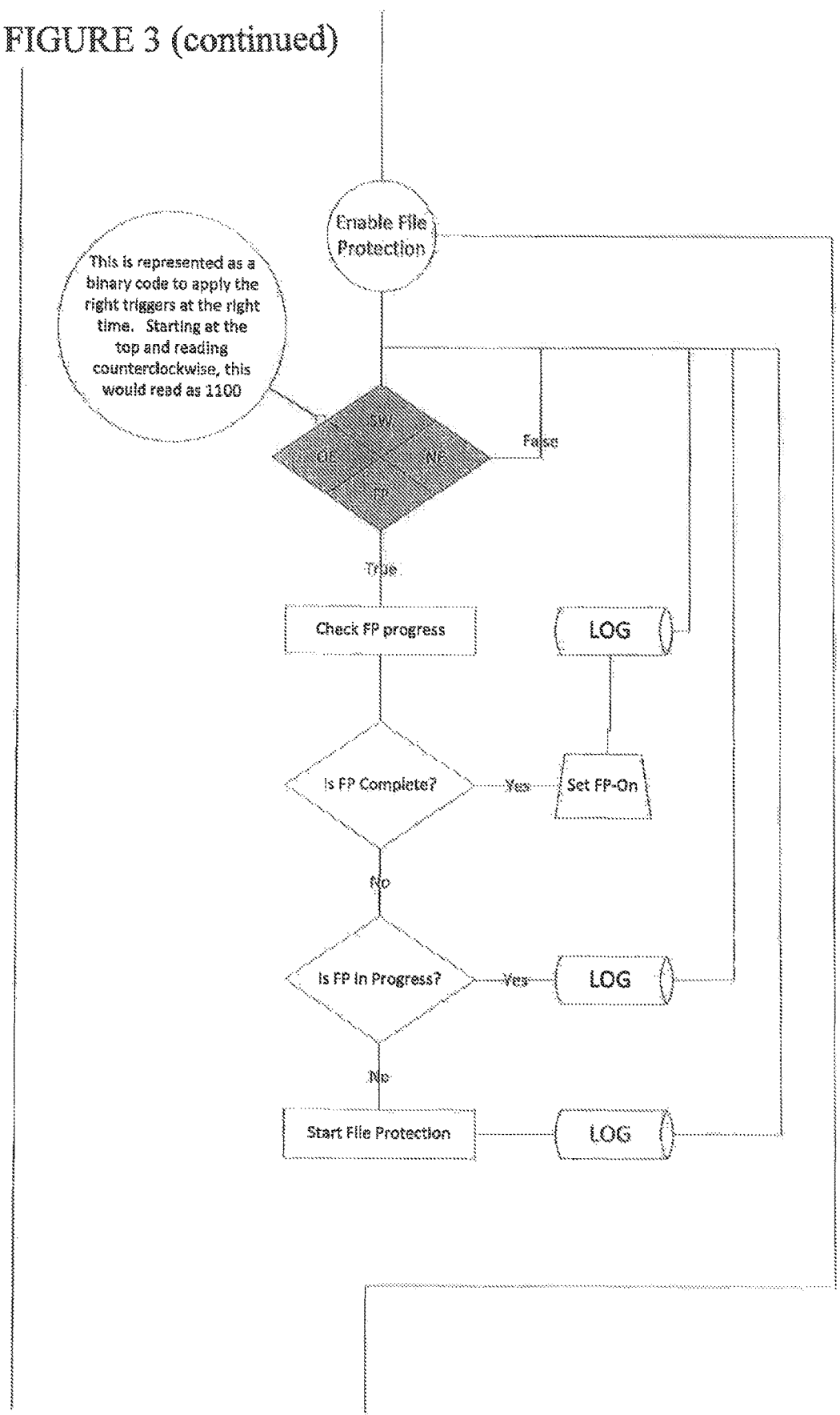
Figure 3:
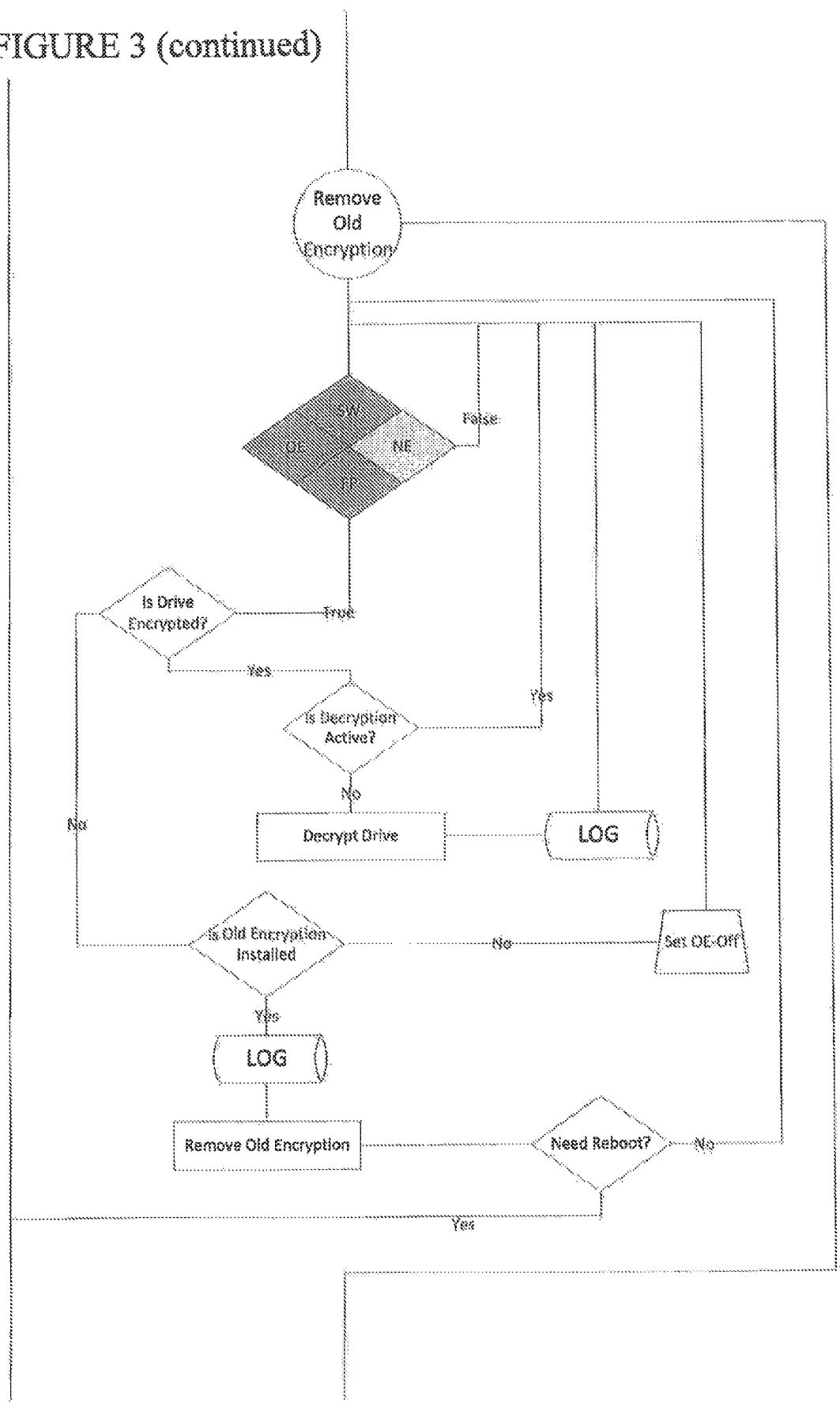
Figure 3:
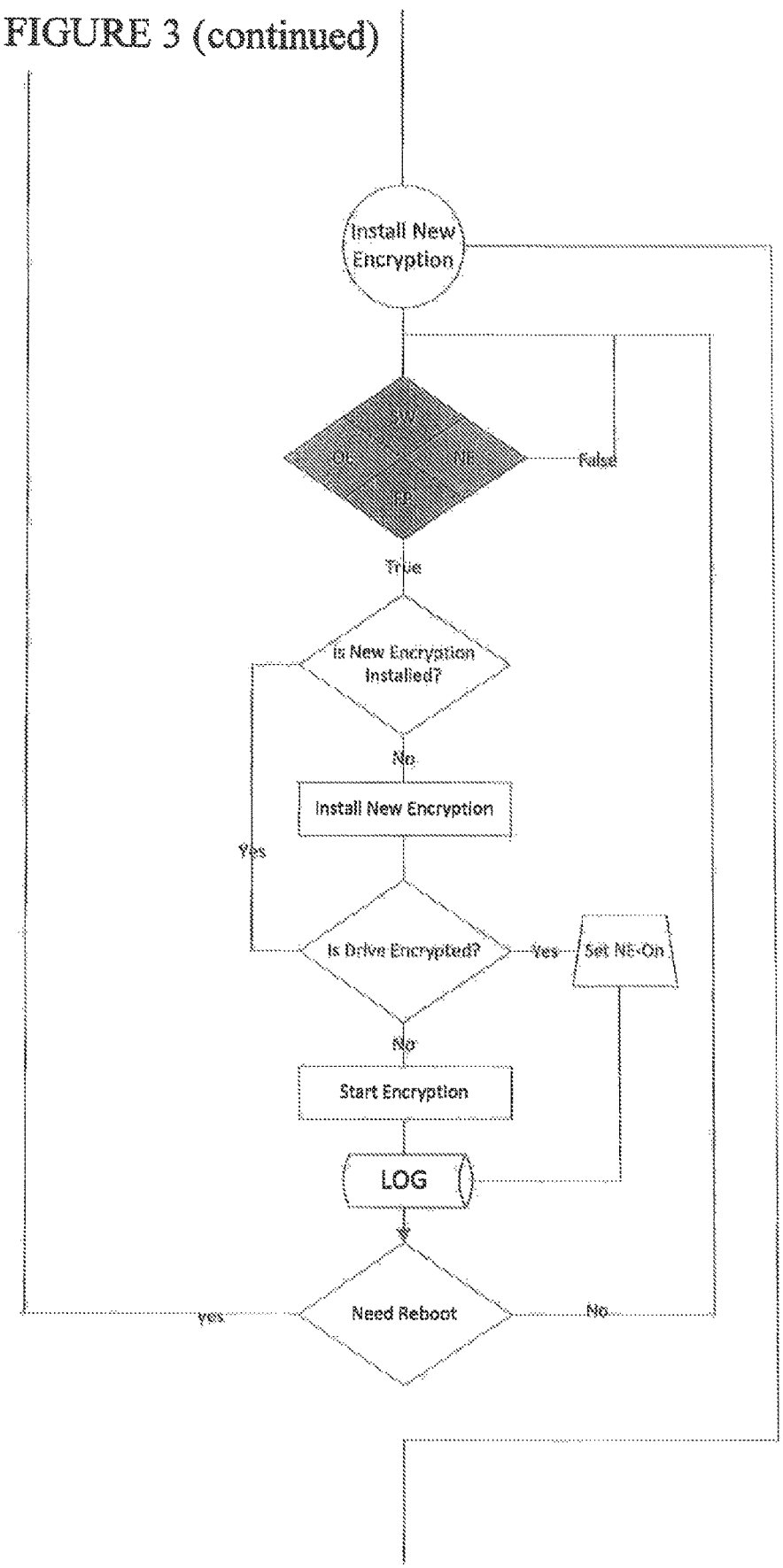
Figure 3:
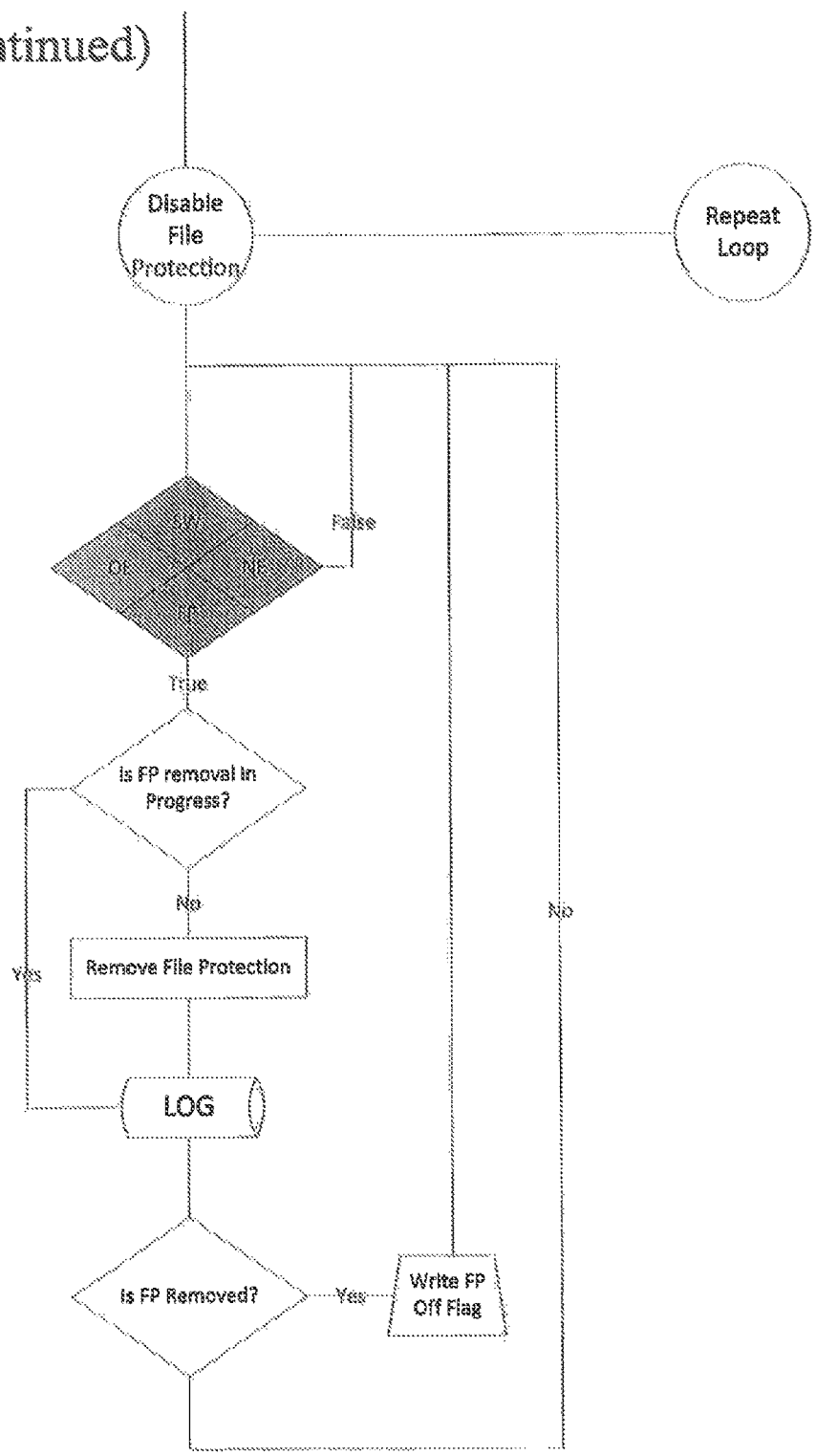

The software of the present invention preferably starts with a single command to execute. Upon execution it immediately locks the computer in question for the duration of the conversion to keep the computer secure and to prevent interruption during the conversion. The process includes adding a second layer of encryption to the drive, removing the unwanted encryption software, and then applying the new encryption. At this point, the secondary encryption is removed and the computer is unlocked for normal usage. In a preferred embodiment, the present invention may be flowed as shown in FIGS. 1-3.

Persons of ordinary skill in the art will understand that to "remove" the first, original layer of encryption includes decrypting the computer and removing the encryption software, and that the commands to do this will vary based on the original encryption vendor. To accomplish this programmatically, software will preferably automatically execute the vendor's commands necessary to decrypt and uninstall. During this step, the process will preferably monitor the computer drive being re-encrypted to know when the decryption is complete.

Persons of ordinary skill will also understand that "applying" new encryption software refers to automatically installing the newly-chosen encryption vendor and programmatically running the commands necessary to automatically encrypt. The process will preferably monitor the computers being re-encrypted and signal the encrypter when the computer drive(s) is/are fully encrypted and protected with the new encryption.

The above description is not intended to limit the meaning of the words used in the following claims that define the invention. Persons of ordinary skill in the art will understand that a variety of other designs still falling within the scope of the following claims may be envisioned and used. For example, while preferred embodiments involving the use of binary triggers to identify state have been disclosed, in other embodiments, independent registry and file checks may be used, in addition, the encryption tool for the second layer of encryption may be any file-level encryption tool; while a general file-level encryption has been described for this second layer of encryption, other embodiments can employ other known types of file-level encryption.

It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A method for converting data with a first, original layer of encryption on one or more local hard drives of one or more computers, by adding a second layer of encryption to the data while removing the first layer of encryption, and without exposing the data in a decrypted state during the conversion process, comprising the steps of:

launching the conversion process;

locking the one or more computers for the duration of the conversion process, whereby users have no access to the one or more computers during the conversion process;

adding a second layer of encryption to the one or more drives of the one or more locked computers, thereby re-encrypting all of the data on the one or more drives;

after the second layer of encryption has been added to the one or more drives of the one or more computers, removing the first layer of encryption, without the need for decrypting any of the data on the one or more drives of the one or more locked computers;

applying the new encryption software corresponding to the second layer of encryption; and unlocking the one or more previously locked computers for normal usage, whereby the users once again have access to the one or more computers.

2. The method of claim 1, wherein the launching step may be performed remotely.

3. The method of claim 1, wherein the conversion process may be executed without the need for a user to manually interact with the one or more locked computers.

4. The method of claim 1, wherein the conversion process may be executed while logging all progress to a central server in communication with the one or more locked computers.

\* \* \* \* \*